(12) United States Patent
Palmer et al.

(10) Patent No.: US 9,025,438 B1
(45) Date of Patent: May 5, 2015

(54) SYSTEM AND METHOD FOR COMMUNICATION FAILOVER

(75) Inventors: Charles A. Palmer, Overland Park, KS (US); Kevin Thomas Boland, Olathe, KS (US); Donald Eugene Lawver, Olathe, KS (US); Jeffrey Francis Smith, Olathe, KS (US); William Lyle Wiley, Overland Park, KS (US)

(73) Assignee: Century Link Intellectual Property LLC, Denver, CO (US)

( * ) Notice: Subject to any disclaimer, the term of this patent is extended or adjusted under 35 U.S.C. 154(b) by 480 days.

(21) Appl. No.: 12/825,507

(22) Filed: Jun. 29, 2010

(51) Int. Cl.
*H04L 12/66* (2006.01)
*H04L 12/28* (2006.01)
*H04M 1/64* (2006.01)
*H04M 3/42* (2006.01)
*G06F 15/16* (2006.01)
*G06F 11/00* (2006.01)
*G06F 9/00* (2006.01)
(Continued)

(52) U.S. Cl.
CPC .............. *H04L 45/28* (2013.01); *H04M 7/0006* (2013.01)

(58) Field of Classification Search
CPC . H04L 49/55; H04L 69/40; H04L 2012/5627; H04L 12/2422; H04L 12/40182; H04L 1/22; H04L 12/66; H04L 29/06; H04L 29/14; H04L 29/0809; H04L 29/06027; H04L 29/06068; H04L 29/06095; H04L 29/06326; H04L 29/08072; H04L 29/08576; H04L 45/00; H04L 45/22; H04L 45/28; H04L 47/10; H04L 49/351; H04L 63/08; H04L 63/029; H04L 63/083; H04L 63/0281; H04L 63/0428; H04M 1/74; H04M 1/80; H04M 3/08; H04M 3/42314; H04M 7/0003; H04M 7/006; H04M 7/0024; H04M 7/0057; H04M 3/533; H04M 3/4938; H04M 2201/60; G06F 11/16; G06F 11/18; G06F 11/2002; G06F 11/2005; G06F 11/2025; G06F 11/0709; G06F 11/2028; H04J 3/14; H04B 1/0466; H04B 10/03; H04B 10/0771; H04B 10/0791; H05K 999/99; H04Q 3/0029; H04Q 3/66; H04Q 2213/13103; H04Q 2213/13097; H04Q 2213/13141
USPC .......... 370/225, 216, 242, 245, 252, 217, 352, 370/401; 379/1.01, 22.03, 26, 32, 167.11, 379/900, 88.17, 220.01; 714/2, 43, 799, 714/E11.007, E11.011, E11.015, 714/E11.021–E11.029, E11.144, E11.161, 714/4.1; 455/7; 709/227, 249; 726/12
See application file for complete search history.

(56) References Cited

U.S. PATENT DOCUMENTS

| 5,598,401 A | 1/1997 | Blackwell et al. |
| 5,889,470 A | 3/1999 | Kaycee et al. |
| 6,553,515 B1 | 4/2003 | Gross et al. |

(Continued)

OTHER PUBLICATIONS

U.S. Appl. No. 11/823,528; Non Final Office Action dated Feb. 14, 2012; 30 pages.

(Continued)

*Primary Examiner* — Alpus H Hsu
*Assistant Examiner* — Dharmesh Patel
(74) *Attorney, Agent, or Firm* — Swanson & Bratschun, L.L.C.

(57) ABSTRACT

A system and method for communication failover is disclosed. The disclosed embodiments allow voice communications (both inbound and outbound) that are normally carried by VoIP to be automatically switched over to a PSTN in the event of a failure of the VoIP communication network.

23 Claims, 12 Drawing Sheets

(51) Int. Cl.
*H04L 12/703* (2013.01)
*H04M 7/00* (2006.01)

(56) References Cited

U.S. PATENT DOCUMENTS

| | | | |
|---|---|---|---|
| 6,926,708 B1 | 8/2005 | Franks-Farah et al. | |
| 7,254,832 B1* | 8/2007 | Christie, IV | 726/11 |
| 7,260,089 B2* | 8/2007 | Lowmaster | 370/352 |
| 8,315,165 B2 | 11/2012 | Eydelman et al. | |
| 8,976,785 B2 | 3/2015 | Sweeney et al. | |
| 2001/0053125 A1* | 12/2001 | Staples et al. | 370/217 |
| 2003/0091028 A1* | 5/2003 | Chang et al. | 370/352 |
| 2003/0202462 A1 | 10/2003 | Smith et al. | |
| 2004/0032945 A1 | 2/2004 | Huang et al. | |
| 2004/0170160 A1 | 9/2004 | Li et al. | |
| 2005/0025043 A1 | 2/2005 | Mussman et al. | |
| 2005/0053051 A1 | 3/2005 | Beyda et al. | |
| 2005/0083928 A1* | 4/2005 | Sivabalan et al. | 370/389 |
| 2005/0141675 A1 | 6/2005 | Jung | |
| 2005/0286711 A1 | 12/2005 | Lee et al. | |
| 2006/0023657 A1* | 2/2006 | Woodson et al. | 370/328 |
| 2006/0050682 A1 | 3/2006 | Vance | |
| 2006/0187898 A1 | 8/2006 | Chou et al. | |
| 2006/0193447 A1* | 8/2006 | Schwartz | 379/45 |
| 2007/0004396 A1 | 1/2007 | Connelly | |
| 2007/0023455 A1 | 2/2007 | Krengel et al. | |
| 2007/0165611 A1 | 7/2007 | Yang et al. | |
| 2008/0159273 A1* | 7/2008 | Brugman | 370/356 |
| 2008/0285485 A1* | 11/2008 | Kingsley | 370/259 |
| 2008/0285544 A1* | 11/2008 | Qiu et al. | 370/352 |
| 2008/0298348 A1 | 12/2008 | Frame et al. | |
| 2009/0003318 A1 | 1/2009 | Sweeney et al. | |
| 2009/0097471 A1* | 4/2009 | Qiu et al. | 370/352 |
| 2009/0161741 A1 | 6/2009 | Ginis et al. | |
| 2009/0225744 A1* | 9/2009 | Zerillo | 370/352 |

OTHER PUBLICATIONS

U.S. Appl. No. 11/823,528; Final Office Action dated Nov. 8, 2011; 31 pages.
U.S. Appl. No. 11/823,528; Non Final Office Action dated Apr. 13, 2011; 30 pages.
U.S. Appl. No. 11/823,528; Non Final Office Action dated Sep. 14, 2012; 29 pages.
U.S. Appl. No. 11/823,528; Final Rejection dated Jan. 7, 2013; 31 pages.
U.S. Appl. No. 11/823,528; Non Final Rejection dated Jun. 3, 2013; 30 pages.
U.S. Appl. No. 11/823,528; Final Rejection dated Oct. 25, 2013; 31 pages.
U.S. Appl. No. 11/823,528; Non-Final Rejection dated Jun. 20, 2014; 38 pages.
U.S. Appl. No. 11/823,528; Notice of Allowance dated Oct. 28, 2014; 33 pages.
U.S. Appl. No. 11/823,528; Issue Notification dated Feb. 18, 2015; 1 page.

* cited by examiner

SYSTEM AND METHOD FOR COMMUNICATION FAILOVER

FIELD OF THE DISCLOSURE

The present disclosure generally relates to telecommunications, and more particularly to system and method for communication failover.

BACKGROUND OF THE DISCLOSURE

Voice over Internet Protocol (VoIP) is a general term for a family of transmission technologies for delivery of voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone, among others. The basic steps involved in originating a VoIP telephone call are conversion of the analog voice signal to digital format and compression/translation of the signal into Internet protocol (IP) packets for transmission over the Internet; the process is reversed at the receiving end.

VoIP systems employ session control protocols to control the set-up and tear-down of calls as well as audio codecs which encode speech allowing transmission over an IP network as digital audio via an audio stream. Codec use is varied between different implementations of VoIP (and often a range of codecs are used); some implementations rely on narrow-band and compressed speech, while others support high fidelity stereo codecs.

While VoIP communication is now becoming widespread, some customers are understandably concerned that VoIP data networks are not as reliable as the traditional PSTN, which is exceptionally reliable. Particularly with many business customers, the voice telephone network is a mission critical function of the company, such that when a company's voice network fails (even temporarily), the company's business is also effectively shut down during the period of failure.

Many potential customers would like to take advantage of the inherent benefits of VoIP technology; however, they may have past experience of frequent down time with their own internal computer networks that may make them hesitant to commit their voice communications to a computer network-based communications platform. There therefore exists a need for systems and methods that improve the robustness of VoIP communications. The present disclosure is directed toward systems and methods which meet this and other needs.

SUMMARY OF THE DISCLOSURE

The present invention provides a system and method for communication failover to an alternate communication link. The claims, and only the claims, define the invention.

The disclosed embodiments allow voice communications (both inbound and outbound) that are normally carried by VoIP to be automatically switched over to a PSTN in the event of a failure of the VoIP communication network.

In one embodiment, a method for communication failover is disclosed, the method comprising the steps of (a) attempting to establish a first communication link over a data network; (b) failing to establish said first communication link over the data network; and (c) upon said failing to establish said first communication link over the data network, automatically establishing a second communication link over a public switched telephone network.

In another embodiment, a system for communication failover is disclosed, comprising a private branch exchange; a first public switched telephone network communication line operatively coupled to said private branch exchange; a Class 5 switch operatively coupled to said first public switched telephone network communication line; and a second public switched telephone network communication line operatively coupled to said private branch exchange, said second public switched telephone network communication line not coupled to said Class 5 switch.

Other embodiments are additionally disclosed.

DESCRIPTION OF THE ILLUSTRATED EMBODIMENTS

Figure 1:
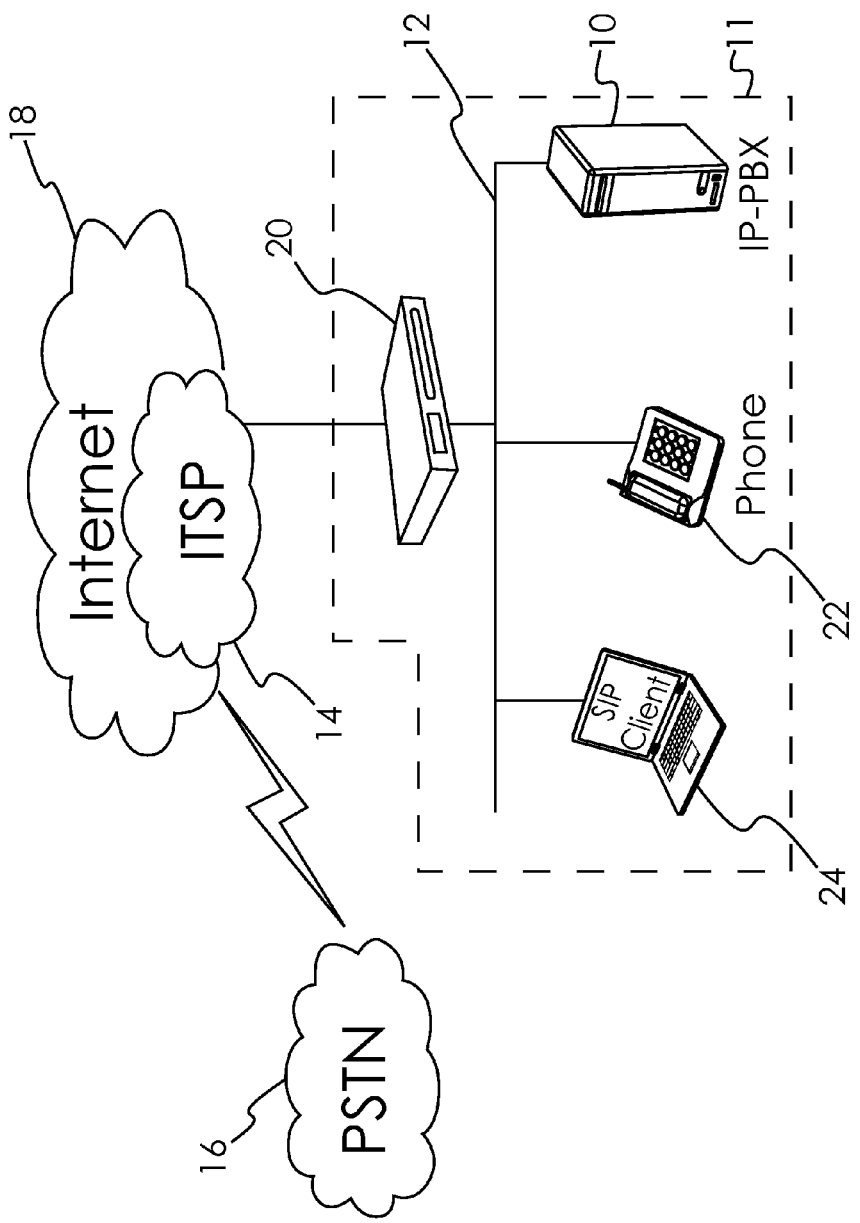
FIG. 1 is a schematic block diagram of a prior art SIP trunking network.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

In certain embodiments, the present disclosure is directed to a system and method for improving the robustness of VoIP communications systems.

In certain other embodiments, the present disclosure is directed to systems and methods that provide for automatic failover of voice communications from a VoIP network to a PSTN in the event of a failure of the VoIP network. The disclosed embodiments provide for continuation of both inbound and outbound communications for the period of failure of the VoIP network.

Referring to FIG. 1, there is shown an example of a typical prior art arrangement for the provision of VoIP communications to a customer. An Internet Protocol Private Branch Exchange (IP-PBX) 10 allows a customer to implement VoIP communication within their enterprise 11 over a suitable local area network (LAN), such as a network address translation (NAT) LAN, an Ethernet, or other appropriate network wiring 12. Additionally, the IP-PBX 10 can allow the enterprise 11 to not only communicate using VoIP within the enterprise 11, but also outside the enterprise 11 by using a Session Initiation Protocol (SIP) trunk provided by an Internet Telephony Service Provider (ITSP) 14 to connect to the traditional PSTN network 16. A SIP trunk connection is a service offered by many ITSPs 14 that connects enterprise 11 IP-PBX 10 to the existing telephone system infrastructure (PSTN 16) via the internet 18 using the SIP VoIP standard.

The SIP connection typically will use the same internet 18 connection that is used for normal data transfer into and out of the enterprise 11. For example, the SIP trunking interface may be a SIP-capable firewall within the enterprise 11 or any other SIP-enabling edge device 20. Use of a SIP trunking interface 20 removes the need to also have a Basic Rate Interface (BRI) or Primary Rate Interface (PRI) (both of which are Integrated Services Digital Network (ISDN) configurations defined in the physical layer standard I.430 produced by the International Telecommunication Union (ITU)) for use in the access network that connects the enterprise 11 with its immediate service provider. Unlike in traditional telephony, where bundles of physical wires were once delivered from the service provider to the enterprise 11, a SIP trunk allows the enterprise 11 to replace these traditional fixed PSTN lines with PSTN 16 connectivity via a SIP trunking service provider 14 on the internet 18. SIP trunks can eliminate the need for local PSTN gateways and ISDN BRIs or PRIs.

One or more Internet Protocol (IP) telephones 22, which have an RJ-45 Ethernet (or other appropriate) connector allowing the IP telephones 22 to connect directly to the SIP device 20, may be connected to the network 12 and have all of the hardware and software necessary to handle VoIP communications integrated within them. Additionally, a computer 24 may be coupled to the network 12, running SIP client software to manage the communications over the SIP device 20.

As can be seen from the diagram of FIG. 1, loss of internet 18 connectivity results in total loss of voice communication functionality for the enterprise 11 since the only connection between the IP telephones 22 and the PTSN 16 is through the internet 18. This can have severe consequences for an enterprise 11 where access to voice communication functionality is mission critical. Even when not mission critical, such loss of voice communication functionality is inconvenient at best, and may damage the reputation of the enterprise 11.

In embodiments disclosed herein, systems and methods are provided that allow for automatic failover to local PRIs in the event of a failure of the SIP trunk connection. In order to provide such a backup voice communications channel, certain embodiments disclosed herein provide a PSTN connection to the enterprise 11 as a redundant backup to the SIP trunk that will normally carry the voice communications into and out of the enterprise 11. As will be appreciated, it is not sufficient to simply connect the telephones of the enterprise 11 to the redundant PSTN lines in the event of a failure of the SIP trunk. Such an action would allow outbound calls from the enterprise 11, but inbound calls would still be routed by the external communications network to the failed SIP trunk.

Figure 2:
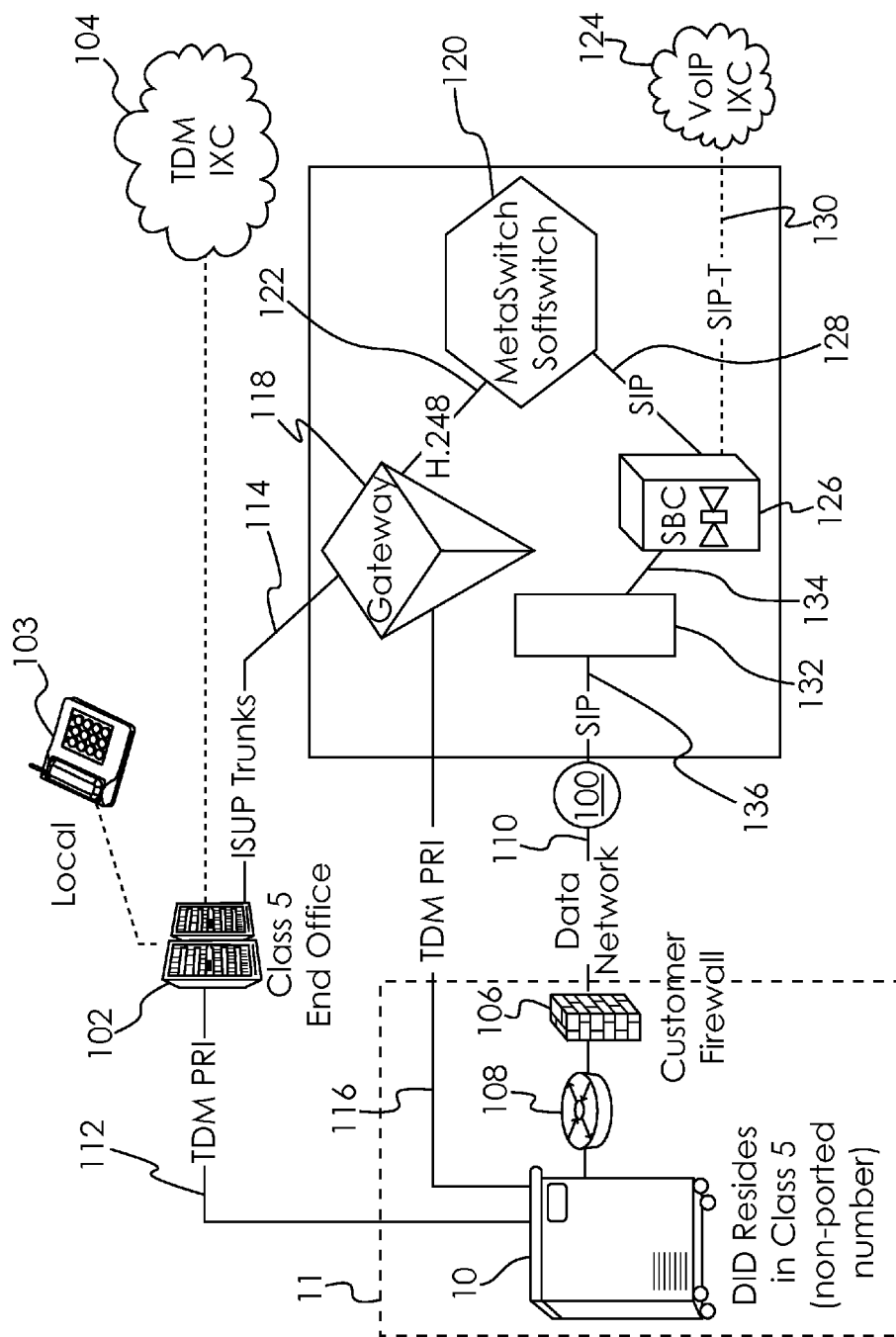
FIG. 2 is a schematic block diagram of a system for SIP trunking failover to a PSTN according to one embodiment of the present disclosure.

FIG. 2 is a schematic block diagram illustrating one embodiment that allows SIP trunking failover to local PRIs in the event of a failure of the connection to the internet such as, for example, failure point 100 in FIG. 2. It will be appreciated by those skilled in the art that the presently disclosed embodiments will allow failover when the IP-PBX 10 in the enterprise 11 fails to establish communication with the external communications network, regardless of where the failure point occurs or what the reason is for the failure. For example, even failure of one of the devices on the network side of the communications channel, which thus prevents the IP-PBX 10 from establishing connection with the VoIP IXC 124, will trigger the presently disclosed embodiments to failover to the local PRIs.

With continuing reference to FIG. 2, a Class 5 end office telephone switch 102 is illustrated and is a telephone switch or telephone exchange in the PSTN located at the local telephone company's central office, directly serving subscribers such as the enterprise 11. Class 5 switch 102 services include basic dial-tone, calling features, and additional digital and data services to subscribers using the local loop. The Class 5 end office 102 provides connection to both local telephones 103 within the exchange serviced by the Class 5 switch 102, as well as the time-division multiplexing interexchange carrier (TDM IXC) 104. An Interexchange Carrier (IXC) is a U.S. legal and regulatory term for a telecommunications company, commonly called a long-distance telephone company, in the United States. It is defined as any carrier that provides inter-LATA communication, where a LATA is a local access and transport area. An IXC carries traffic, usually voice traffic, between telephone exchanges. Telephone exchanges are usually identified in the United States by the three-digit area code (NPA) and the first three digits of the phone number (NPA-NXX). Different exchanges are generally in different geographic locations, such as separate central offices (COs, also called "wire centers"). IXCs typically carry voice traffic in a digitized form. Therefore, voice traffic is more typically a data stream. These voice data streams therefore can be intermixed with data traffic, too, such as uplinks for digital subscriber lines (DSL). Most commonly, links between IXCs and COs are asynchronous transfer mode (ATM) links carried on optical fiber.

IP-PBX 10 (such as a CS1000 communication server available from Nortel, 195 The West Mall, Toronto, Ontario M9C 5K1 Canada or Avaya Inc., 211 Mt. Airy Road, Basking Ridge, N.J. 07920 USA) resides within the enterprise 11 behind the firewall 106. In some embodiments, a router 108 couples the incoming data network 110 to the IP-PBX 10, as well as to any other devices within the enterprise 11 that require internet connectivity. In the event of a failure in the connection to the internet 18 at point 100 (for example), the IP-PBX 10 can be programmed to route telephone calls out of the enterprise 11 (i.e. outbound telephone calls only) to the Class 5 end office 102 via the TDM PRI line 112. It is a fairly straightforward matter to configure the IP-PBX 10 to failover to TDM PRI line 112 whenever failure point 100 is preventing calls from being routed to the internet 18. IP-PBX 10 has no control, however, over the routing of external calls into the enterprise 11, since such call routing is handled on the network side of the communication path. In the present embodiment, the Class 5 end office 102 provides backup lines to the enterprise 11 over which inbound call traffic may be routed in the event that calls cannot be routed to the IP-PBX 10 from the internet 18 as explained in greater detail below.

Direct inward dialing (DID) resides in the Class 5 switch 102 utilizing a non-ported number. DID is a feature offered by telephone companies for use with their customers' PBX 10 systems. In DID service, the telephone company provides one or more trunk lines 114 to the customer for connection to the customer's PBX 10 and allocates a range of telephone numbers to this line (or group of lines) and forwards all calls to such numbers via the trunk 114. As calls are presented to the PBX 10 via TDM PRI 116, the destination dialed number identification service (DNIS) is transmitted, usually partially (e.g., last four digits), so that the PBX 10 can route the call directly to the desired telephone extension within the enterprise 11 without the need for an operator or attendant. The service allows direct inward call routing to each extension while maintaining only a limited number of subscriber lines to satisfy the average concurrent usage of the customer.

In some embodiments, trunk line 114 comprises an ISDN User Part (ISUP) trunk. ISUP is part of the Signaling System #7 which is used to set up telephone calls in Public Switched Telephone Networks (PSTN). When a telephone call is set up from one subscriber to another, many telephone exchanges may be involved, possibly across international boundaries. To allow a call to be set up correctly, where ISUP is supported, a switch will signal call-related information like called or calling party number to the next switch in the network using ISUP messages.

The trunks 114 are coupled to a media gateway 118 (such as an MG3510 media gateway available from MetaSwitch Networks, 1001 Marina Village Pkwy, Suite 100, Alameda, Calif. 94501 USA). Media gateway 118 is a translation device or service that converts digital media streams between disparate telecommunications networks (such as PSTN, SS7, Next Generation Networks (2G, 2.5G and 3G radio access networks) or PBX). Media gateways enable multimedia communications across networks over multiple transport protocols such as Asynchronous Transfer Mode (ATM) and Internet Protocol (IP). Because the media gateway 118 connects different types of networks, one of its main functions is to convert between different transmission and coding techniques. Media streaming functions such as echo cancellation, dual tone multi-frequency (DTMF), and tone sender are also located in the media gateway 118. The media gateway 118 incorporates all of the functions needed to support TDM media and signaling connectivity across multiple telephony protocols (including VoIP), such as handling the transport of SS7 and ISDN signaling messages.

Media gateway 118 is coupled to media gateway controller 120 (such as an Integrated Softswitch available from MetaSwitch Networks, 1001 Marina Village Pkwy, Suite 100, Alameda, Calif. 94501 USA), which provides call control and signaling functionality. In one embodiment, connection 122 between the media gateway 118 and the media gateway controller 120 is governed by H.248 (also known as Megaco), which is an implementation of the Media Gateway Control Protocol architecture that defines the protocol for media gateway controller 120 to control media gateway 118 for providing VoIP services between IP networks and the PSTN 16. In other embodiments, other protocols may be used between media gateway controller 120 and media gateway 118, such as Simple Gateway Control Protocol (SGCP), Internet Protocol Device Control (IPDC), Media Gateway Control Protocol (MGCP), just to name a few non-limiting examples.

VoIP communications are transmitted to and received from the VoIP interexchange carrier (IXC) 124 by session border controller (SBC) 126 (such as a Net-Net 4250 Platform available from Acme Packet, 71 Third Avenue, Burlington, Mass. 01803 USA). Session border controller (SBC) 126 is a device used to exert control over the signaling and the media streams involved in setting up, conducting, and tearing down telephone calls or other interactive media communications between two service provider networks in a peering environment, or between an access network and a backbone network to provide service to enterprise 11. In some embodiments, SBC 126 maintains full session state and offers one or more of the following functions:

Security—to protect the network and other devices from attacks such as denial of service.

Connectivity—to allow different parts of the network to communicate by, for example, supporting network address translation (NAT) traversal.

Quality of service—the QoS policy of a network and prioritization of flows is usually implemented by the SBC.

Regulatory—many times the SBC is expected to provide support for regulatory requirements such as emergency calls and lawful interception.

Statistics—since all sessions that pass through the edge of the network pass through the SBC 126, it is a natural point to gather statistics and information on these sessions.

Within the context of VoIP, the term session refers to a call. Each call consists of one or more call signaling message exchanges that control the call, and one or more call media streams which carry the call's audio, video, or other data along with information of call statistics and quality. Together, these streams make up a session. It is the job of SBC 126 to exert influence over the data flows of sessions. SBC 126 is coupled to the media gateway controller 120 by means of communication line 128 using SIP protocol.

In some embodiments, communications 130 between the SBC 126 and VoIP IXC 124 are conducted using the SIP-T (SIP for telephones) standard. SIP-T is a mechanism that uses SIP to facilitate the interconnection of the PSTN 16 with packet networks (e.g. for interworking ISUP networks with SIP networks). It is characterized by the encapsulation of legacy signaling (typically, though not exclusively, ISUP) in the SIP body for feature transparency, translation of ISUP information into the SIP header for routability, and the use of the INFO method for mid-call signaling. In particular, SIP-T provides the means for conveying ISUP-specific parameters through a SIP network so that calls that originate and terminate on the ISUP network can transit a SIP network with no loss of information. SIP-T defines the mapping of messages, parameters, and error codes between SIP and ISUP. SIP-T communications are fully interoperable with compliant SIP network components on the SIP network. In other embodiments, communications 130 between the SBC 126 and VoIP IXC 124 are conducted using the SIP standard.

Situated between the SBC 126 and the data network 110 coupled to the customer's firewall 106 is an Ethernet access switch 132 (such as an ME3400 Ethernet access switch available from Cisco Systems, Inc., 170 West Tasman Dr., San Jose, Calif. 95134 USA). Ethernet access switches allow deployment of Ethernet-to-the-home (ETTH) "triple play" services (voice, video and data) and Ethernet-to-the-business (ETTB) VPN services. The Ethernet access switch 132 may also provide various security capabilities, such as network-based security to protect the network from unauthorized traffic, switch security to help maintain continuous switch operation, and subscriber security to shield subscribers from other malicious users. Communications 134 between the Ethernet access switch 132 and SBC 126, as well as communications 136 between the Ethernet access switch 132 and the customer firewall 106 are conducted according to the SIP standard.

Normal Operation for Inbound Calls from Local Telephones 103 and TDM IXC 104

In normal operation (i.e. when there is no failure at point 100), calls inbound to the IP-PBX 10 from either local telephones 103 or the TDM IXC 104 are routed as follows:

to the Class 5 switch 102
through the ISUP trunk 114
to the media gateway 118
through the H.248 connection 122 to the media gateway controller 120
through SIP Trunk 128
to SBC 126
through SIP Trunk 134
to Ethernet access switch 132
through the data network 110
through firewall 106
through router 108
to the IP-PBX 10

It will be appreciated that a failure at point 100 will prevent the above sequence from successfully routing a call to the IP-PBX 10. The following sequence is followed when this occurs.

Failover Operation for Inbound Calls from Local Telephones 103 and TDM IXC 104

In failover operation (i.e. when there is a failure at point 100), calls inbound to the IP-PBX 10 from either local telephones 103 or the TDM IXC 104 are routed as follows:
to the Class 5 switch 102
through the ISUP trunk 114
to the media gateway 118
through the TDM PRI line 116
to the IP-PBX 10

It will be appreciated that a failure at point 100 will prevent the SBC 126 from successfully routing a call to the IP-PBX 10. As explained in greater detail below, additional data fills for the SBC 126 and the media gateway controller 120 allow calls to be re-routed to the TDM PRI line 116 using the above route when communication cannot be established to the IP-PBX 10 through the data network 110.

Normal Operation for Inbound Calls from VoIP IXC 124

In normal operation (i.e. when there is no failure at point 100), calls inbound to the IP-PBX 10 from the VoIP IXC 124 are routed as follows:
through the SIP-T line 130
to SBC 126
through SIP Trunk 128
to the media gateway controller 120
through SIP Trunk 128
to SBC 126
through SIP Trunk 134
to Ethernet access switch 132
through the data network 110
through firewall 106
through router 108
to the IP-PBX 10

It will be appreciated that a failure at point 100 will prevent the above sequence from successfully routing a call to the IP-PBX 10. The following sequence is followed when this occurs.

Failover Operation for Inbound Calls from VoIP IXC 124

In failover operation (i.e. when there is a failure at point 100), calls inbound to the IP-PBX 10 from the VoIP IXC 124 are routed as follows:
through the SIP-T line 130
to SBC 126
through SIP Trunk 128
to the media gateway controller 120
through H.248 line 122
to media gateway 118
through TDM PRI line 116
to the IP-PBX 10

It will be appreciated that a failure at point 100 will prevent the SBC 126 from successfully routing a call to the IP-PBX 10. As with calls from local telephones 103 and the TDM IXC 104 discussed above and explained in greater detail below, additional data fills for the SBC 126 and the media gateway controller 120 allow calls to be re-routed to the TDM PRI line 116 using the above route when communication cannot be established to the IP-PBX 10 through the data network 110.

Normal Operation for Outbound Calls

In normal operation (i.e. when there is no failure at point 100), calls outbound from the IP-PBX 10 to the VoIP IXC 124 are routed as follows:
from the IP-PBX 10
through router 108
through firewall 106
through the data network 110
to Ethernet access switch 132
through SIP Trunk 134
to SBC 126
through SIP Trunk 128
to the media gateway controller 120
through SIP Trunk 128
to SBC 126
through the SIP-T Trunk 130
to VoIP IXC 124

It will be appreciated that a failure at point 100 will prevent the above sequence from successfully routing a call from the IP-PBX 10 to the VoIP IXC 124. The following sequence is followed when this occurs.

Failover Operation for Outbound Calls

In failover operation (i.e. when there is a failure at point 100), calls outbound from the IP-PBX 10 are routed as follows:
through the TDM PRI line 112
to Class 5 switch 102
to local telephones 103 (for local calls)
to the TDM IXC 104 (for long distance calls)

It will be appreciated that a failure at point 100 will prevent the IP-PBX 10 from successfully contacting the Ethernet access switch 132 and the SBC 126. Software within the IP-PBX 10 may be easily modified to cause it to re-route outbound calls to the TDM PRI line 116 when communication cannot be established to the data network 110.

Re-programming the IP-PBX 10 for failover to the TDM PRI 112 is relatively straightforward. However, in order to create in-bound call failover capability for SIP Trunking to the IP-PBX 10, additional software programming is required on network-side devices, such as the session border controller 126 and the media gateway controller 120. Additionally, the new physical termination of TDM PRI 116 extended from IP-PBX 10 to the media gateway 118 is required in order to provide the secondary communication path in the event of a failure in the data network 110 path.

Figure 3:
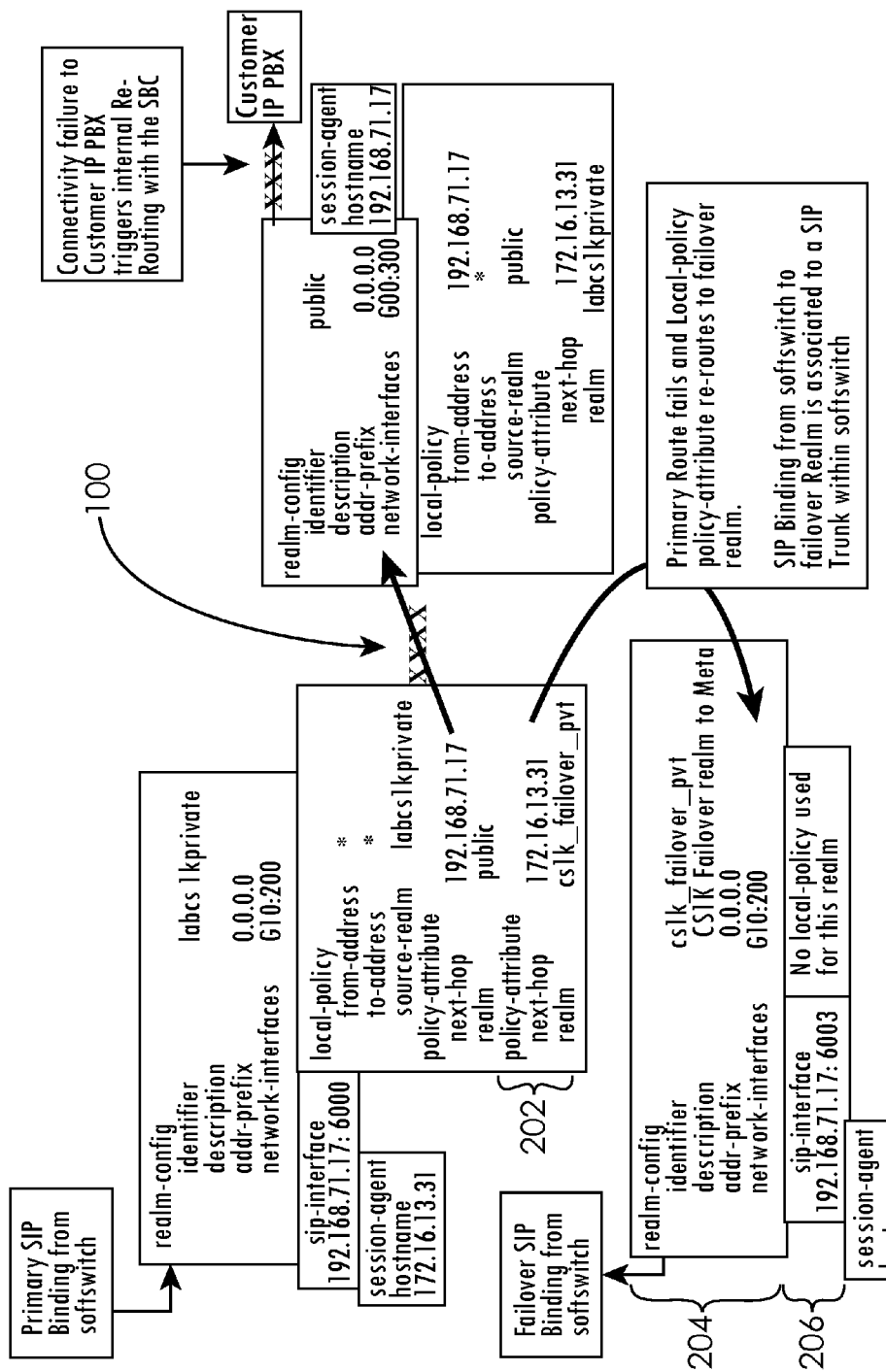
FIG. 3 illustrates an example of data fills to the realm configurations for a Session Border Controller according to one embodiment of the present disclosure

FIG. 3 illustrates an example of additional data fills to the realm configurations for SBC 126. As can be seen, the additional data fill in this embodiment for SBC 126 includes:
Add policy-attribute 202 to local-policy of existing trusted realm for IP-PBX 10 that points to new failover_pvt realm
policy-attribute   next-hop   172.16.13.31   realm cs1k_failover_pvt
Create failover_pvt realm 204 and sip-interface 206
Modify session-agents for media gateway controller 120 and IP-PBX 10 to enable SIP Options—this will separate the SIP Options keep-alive message into two separate activities which keeps the SIP Trunk between the media gateway controller 120 and the SBC 126 in a in-service state during a failure to access the data network 110 in order to allow traffic to loop-around within the SBC 126.

Additional data fills are also added to the media gateway controller 120 as follows:
- Create new PRI Trunk Group for TDM PRI 116 terminated to media gateway 118
- Create new SIP Trunk Group to associate to the SIP Trunk used for failover
- Created new SIP Trunk to associate to SBC 126
- Create new Routing Action for routing on direct media in Routing Table 15 "Initial Table"

The following are SBC 126 data fill modifications in one embodiment to support failover to the TDM PRI 116 to the IP-PBX 10. Underlined font indicates data fill added to SBC 126 (needed on a per IP-PBX basis when failover is implemented):

```
local-policy
   from-address
      *
   to-address
      *
   source-realm
      labcs1kprivate
   description
   activate-time N/A
   deactivate-time N/A
   state enabled
   policy-priority none
   last-modified-by admin@192.168.71.17
   last-modified-date 2009-10-05 10:14:30
   policy-attribute
      next-hop 192.168.71.17
      realm public
      action none
      terminate-recursion disabled
      carrier
      start-time 0000
      end-time 2400
      days-of-week U-S
      cost 0
      app-protocol SIP
      state enabled
      media-profiles
   policy-attribute
      next-hop 172.16.13.31
      realm cs1k_failover_pvt
      action none
      terminate-recursion disabled
      carrier
      start-time 0000
      end-time 2400
      days-of-week U-S
      cost 10
      app-protocol SIP
      state enabled
      media-profiles
realm-config
   identifier cs1k_failover_pvt
   description CS1K Failover realm to Meta
   addr-prefix 0.0.0.0
   network-interfaces G10:200
   mm-in-realm disabled
   mm-in-network enabled
   mm-same-ip enabled
   mm-in-system enabled
   bw-cac-non-mm disabled
   msm-release disabled
   qos-enable disabled
   generate-UDP-checksum disabled
   max-bandwidth 0
   ext-policy-svr
   max-latency 0
   max-jitter 0
   max-packet-loss 0
   observ-window-size 0
   parent-realm
   dns-realm
   media-policy
   in-translationid
   out-translationid
   in-manipulationid
   out-manipulationid
   class-profile
   average-rate-limit 0
   access-control-trust-level high
   invalid-signal-threshold 0
   maximum-signal-threshold 0
   untrusted-signal-threshold 0
   deny-period 30
   symmetric-latching disabled
   pai-strip disabled
   trunk-context
   early-media-allow
   enforcement-profile
   additional-prefixes
   restricted-latching none
   restriction-mask 32
   accounting-enable enabled
   user-cac-mode none
   user-cac-bandwidth 0
   user-cac-sessions 0
   monthly-minutes 0
   net-management-control disabled
   delay-media-update disabled
   refer-call-transfer disabled
   codec-policy
   codec-manip-in-realm disabled
   constraint-name
   steering-pool
      ip-address 172.16.13.67
      start-port 16201
      end-port 16300
      realm-id cs1k_failover_pvt
   network-interface
   sip-interface
      state enabled
      realm-id cs1k_failover_pvt
      description
      sip-port
         address 10.87.13.68
         port 6003
         transport-protocol UDP
         tls-profile
         allow-anonymous all
      carriers
      trans-expire 0
      invite-expire 0
      max-redirect-contacts 0
      proxy-mode
      redirect-action
      contact-mode none
      nat-traversal none
      nat-interval 30
      tcp-nat-interval 90
      registration-caching disabled
      min-reg-expire 300
```

```
registration-interval 3600
route-to-registrar disabled
secured-network disabled
teluri-scheme disabled
uri-fqdn-domain
trust-mode all
max-nat-interval 3600
nat-int-increment 10
nat-test-increment 30
sip-dynamic-hnt disabled
stop-recurse 401,407
port-map-start 0
port-map-end 0
in-manipulationid
out-manipulationid CS1k-Reroute-To-Failover
sip-ims-feature disabled
operator-identifier
anonymous-priority none
max-incoming-conns 0
per-src-ip-max-incoming-conns 0
inactive-conn-timeout 0
untrusted-conn-timeout 0
network-id
ext-policy-server
default-location-string
charging-vector-mode pass
charging-function-address-mode pass
ccf-address
ecf-address
term-tgrp-mode none
implicit-service-route disabled
rfc2833-payload 101
rfc2833-mode transparent
constraint-name
response-map
local-response-map
enforcement-profile
refer-call-transfer disabled
route-unauthorized-calls
tcp-keepalive none
add-sdp-invite disabled
add-sdp-profiles
sip-manipulation
name CS1k-Reroute-To-Failover
description
header-rule
   name NATTo
   header-name To
   action manipulate
   comparison-type case-sensitive
   match-value
   msg-type request
   new-value
   methods
   element-rule
      name NATTo
      parameter-name
      type uri-host
      action replace
      match-val-type ip
      comparison-type case-sensitive
      match-value
      new-value $REMOTE IP
header-rule
   name NATFrom
   header-name From
   action manipulate
      comparison-type case-sensitive
      match-value
      msg-type request
      new-value
      methods
      element-rule
         name NATFrom
         parameter-name
         type uri-host
         action replace
         match-val-type ip
         comparison-type case-sensitive
         match-value
         new-value $LOCAL_IP
header-rule
   name NATRURI
   header-name request-uri
   action manipulate
      comparison-type case-sensitive
      match-value
      msg-type request
      new-value
      methods
      element-rule
         name NATRURI
         parameter-name
         type uri-host
         action replace
         match-val-type ip
         comparison-type case-sensitive
         match-value
         new-value $REMOTE_IP
session-agent
   hostname 192.168.71.17
   ip-address 192.168.71.17
   port 5060
   state enabled
   app-protocol SIP
   app-type
   transport-method UDP
   realm-id public
   egress-realm-id
   description
   carriers
   allow-next-hop-lp enabled
   constraints disabled
   max-sessions 0
   max-inbound-sessions 0
   max-outbound-sessions 0
   max-burst-rate 0
   max-inbound-burst-rate 0
   max-outbound-burst-rate 0
   max-sustain-rate 0
   max-inbound-sustain-rate 0
   max-outbound-sustain-rate 0
   min-seizures 5
   min-asr 0
   time-to-resume 0
   ttr-no-response 0
   in-service-period 0
   burst-rate-window 0
   sustain-rate-window 0
   req-uri-carrier-mode None
   proxy-mode
   redirect-action
   loose-routing enabled
   send-media-session enabled
```

```
response-map CS1k_Response_Maps
ping-method OPTIONS;hops=0
ping-interval 60
ping-send-mode keep-alive
ping-in-service-response-codes
out-service-response-codes
media-profiles
in-translationid
out-translationid
trust-me disabled
request-uri-headers
stop-recurse
local-response-map
ping-to-user-part
ping-from-user-part
li-trust-me disabled
in-manipulationid core-add-record-route
out-manipulationid core-strip-route-and-rr
p-asserted-id
trunk-group
max-register-sustain-rate 0
early-media-allow
invalidate-registrations disabled
rfc2833-mode none
rfc2833-payload 0
codec-policy
enforcement-profile
refer-call-transfer disabled
reuse-connections NONE
tcp-keepalive none
tcp-reconn-interval 0
max-register-burst-rate 0
register-burst-window 0
session-agent
    hostname 172.16.13.31
    ip-address 172.16.13.31
    port 5060
    state enabled
    app-protocol SIP
    app-type
    transport-method UDP
    realm-id *
    egress-realm-id
    description Metaswitch
    carriers
    allow-next-hop-lp enabled
    constraints disabled
    max-sessions 0
    max-inbound-sessions 0
    max-outbound-sessions 0
    max-burst-rate 0
    max-inbound-burst-rate 0
    max-outbound-burst-rate 0
    max-sustain-rate 0
    max-inbound-sustain-rate 0
    max-outbound-sustain-rate 0
    min-seizures 5
    min-asr 0
    time-to-resume 0
    ttr-no-response 0
    in-service-period 0
    burst-rate-window 0
    sustain-rate-window 0
    req-uri-carrier-mode None
    proxy-mode
    redirect-action
    loose-routing enabled
    send-media-session enabled
response-map
ping-method OPTIONS;hops=0
ping-interval 60
ping-send-mode keep-alive
ping-in-service-response-codes
out-service-response-codes
media-profiles
in-translationid
out-translationid
trust-me disabled
request-uri-headers
stop-recurse
local-response-map
ping-to-user-part
ping-from-user-part
li-trust-me disabled
in-manipulationid
out-manipulationid
p-asserted-id
trunk-group
max-register-sustain-rate 0
early-media-allow
invalidate-registrations disabled
rfc2833-mode none
rfc2833-payload 0
codec-policy
enforcement-profile
refer-call-transfer disabled
reuse-connections NONE
tcp-keepalive none
tcp-reconn-interval 0
max-register-burst-rate 0
register-burst-window 0
```

Figure 4:
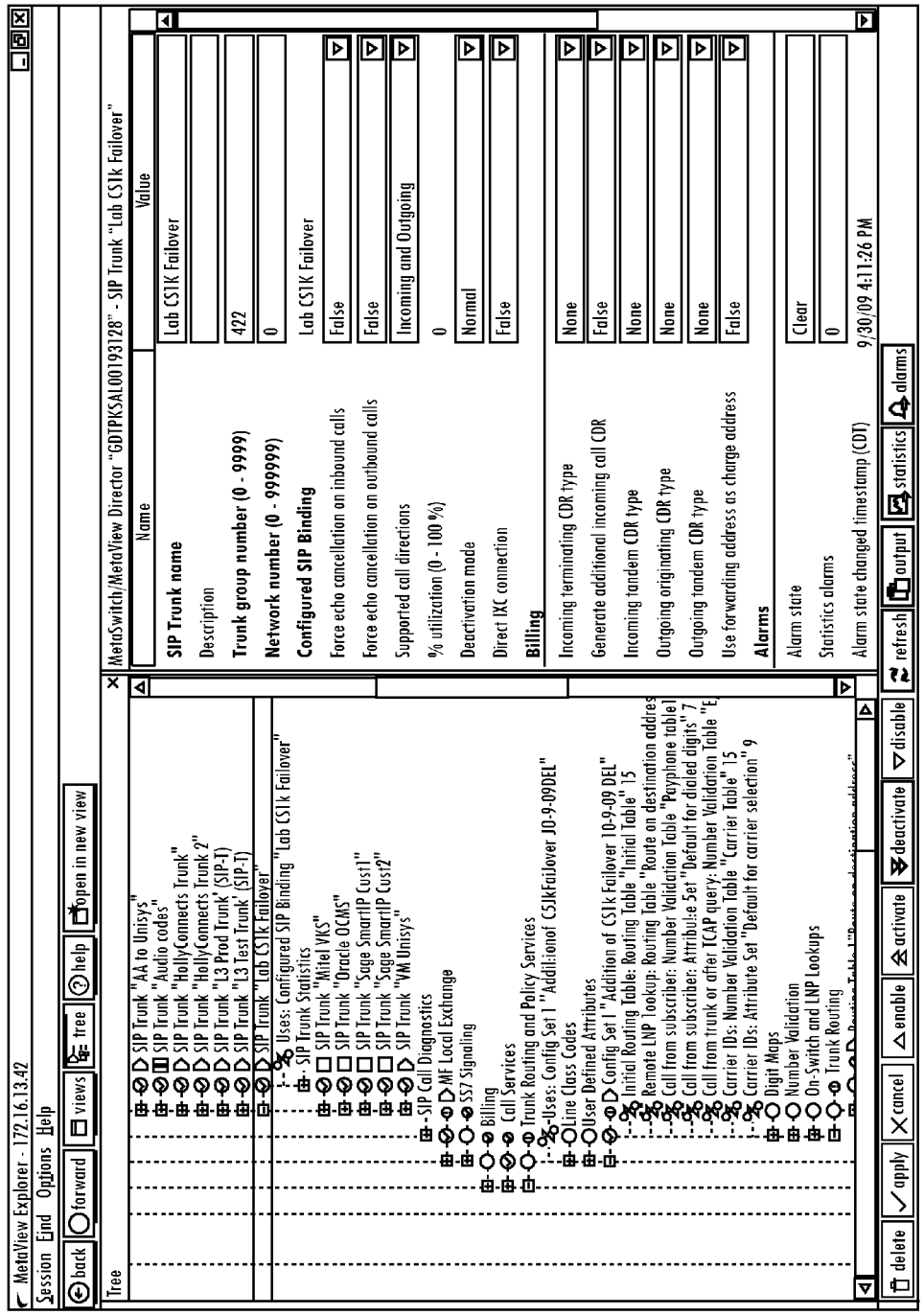
FIG. 4 illustrates an SIP Trunk data fill (Failover Trunk for incoming traffic from the Session Border Controller) according to one embodiment of the present disclosure.

FIG. 4 illustrates an SIP Trunk data fill (Failover Trunk for incoming traffic from SBC 126) using MetaView Explorer (available from MetaSwitch Networks, 1001 Marina Village Pkwy, Suite 100, Alameda, Calif. 94501 USA), a Java-based client that allows introduction of new services into the network.

Figure 5:
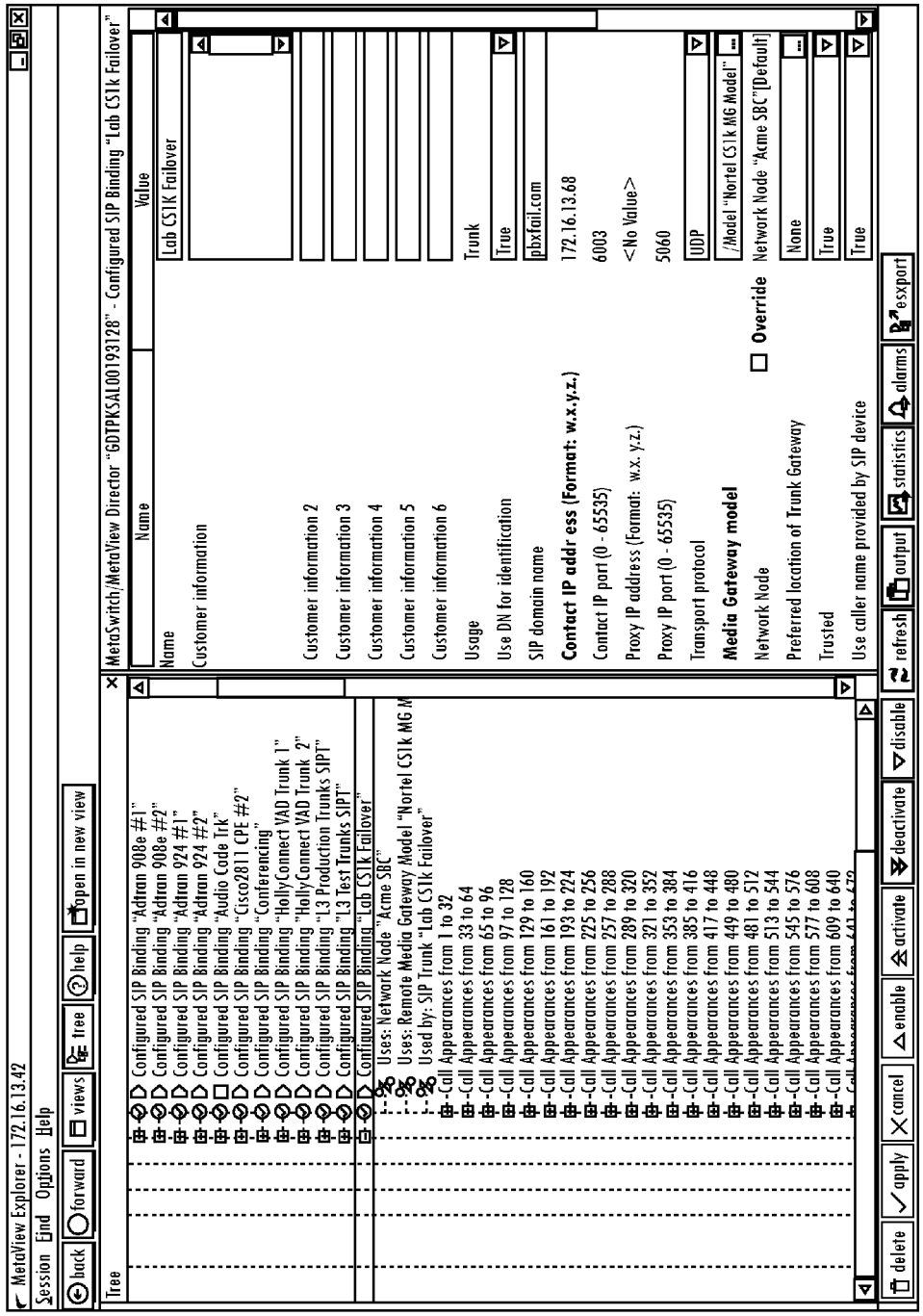
FIGS. 5-7 illustrate a SIP Trunk for Failover data fill (Failover SIP Trunk for incoming traffic from the Session Border Controller) according to one embodiment of the present disclosure.
Figure 6:
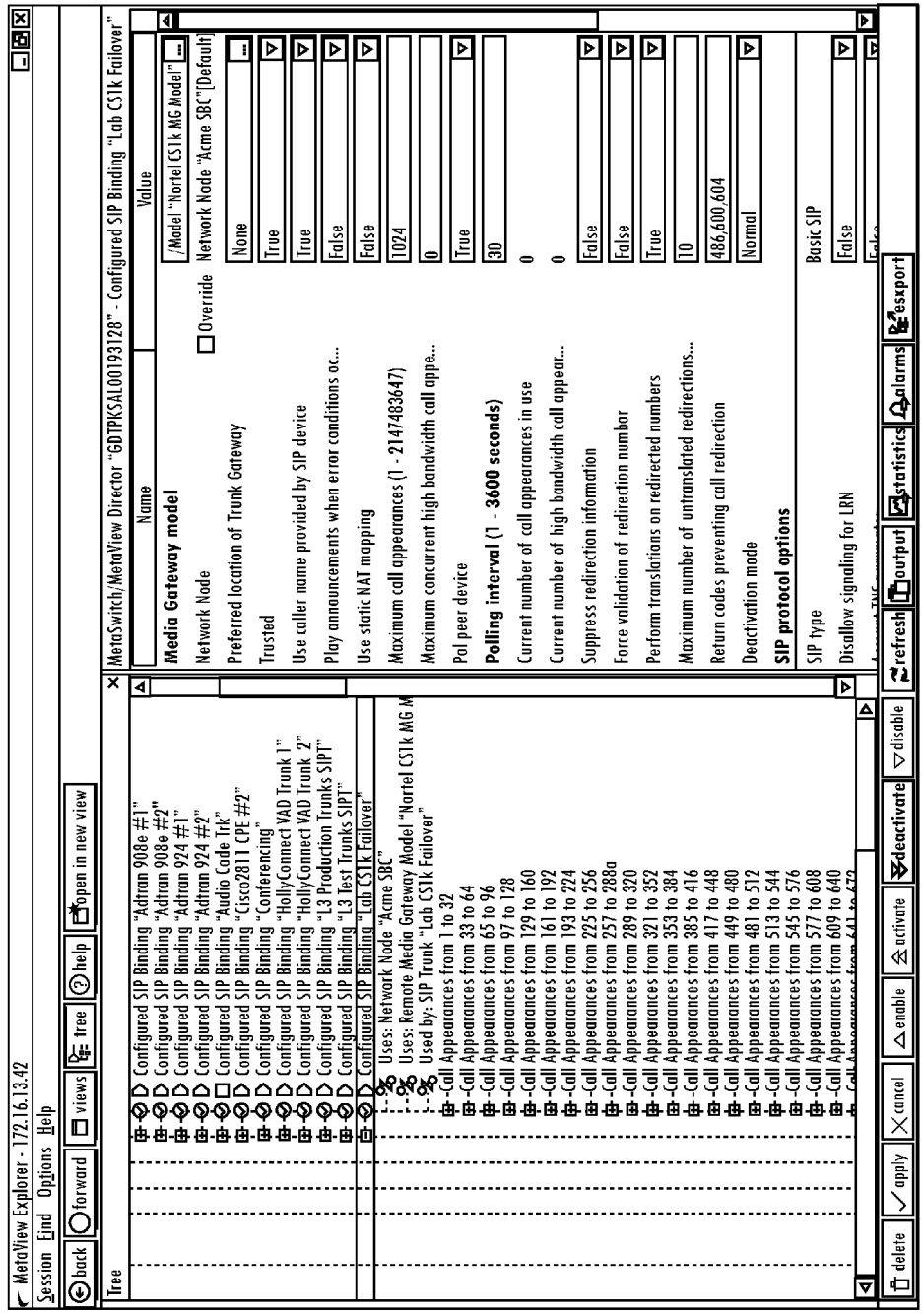
Figure 7:
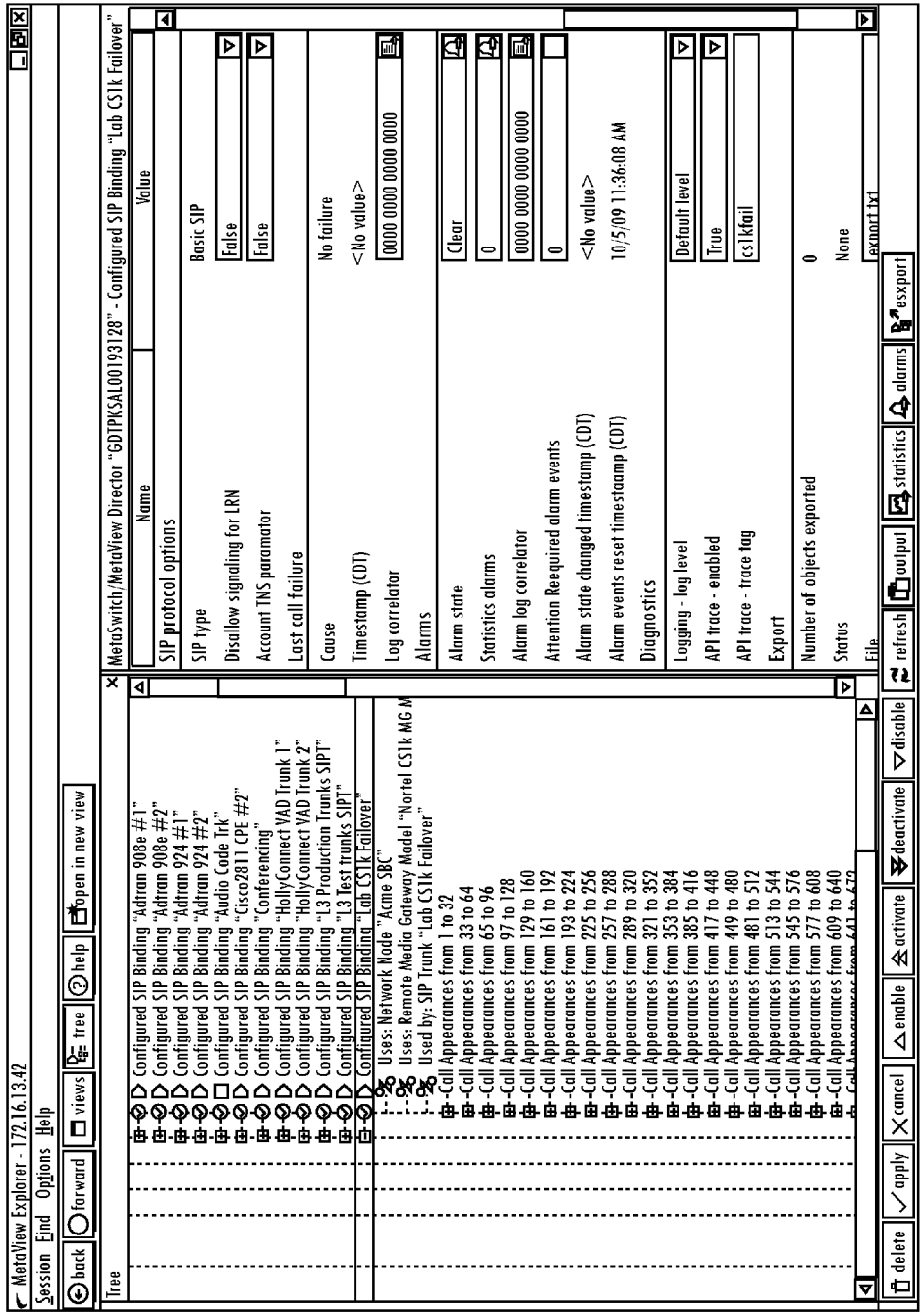

FIGS. 5-7 illustrate a SIP Trunk for Failover data fill (Failover SIP Trunk for incoming traffic from SBC 126) using MetaView Explorer.

Figure 8:
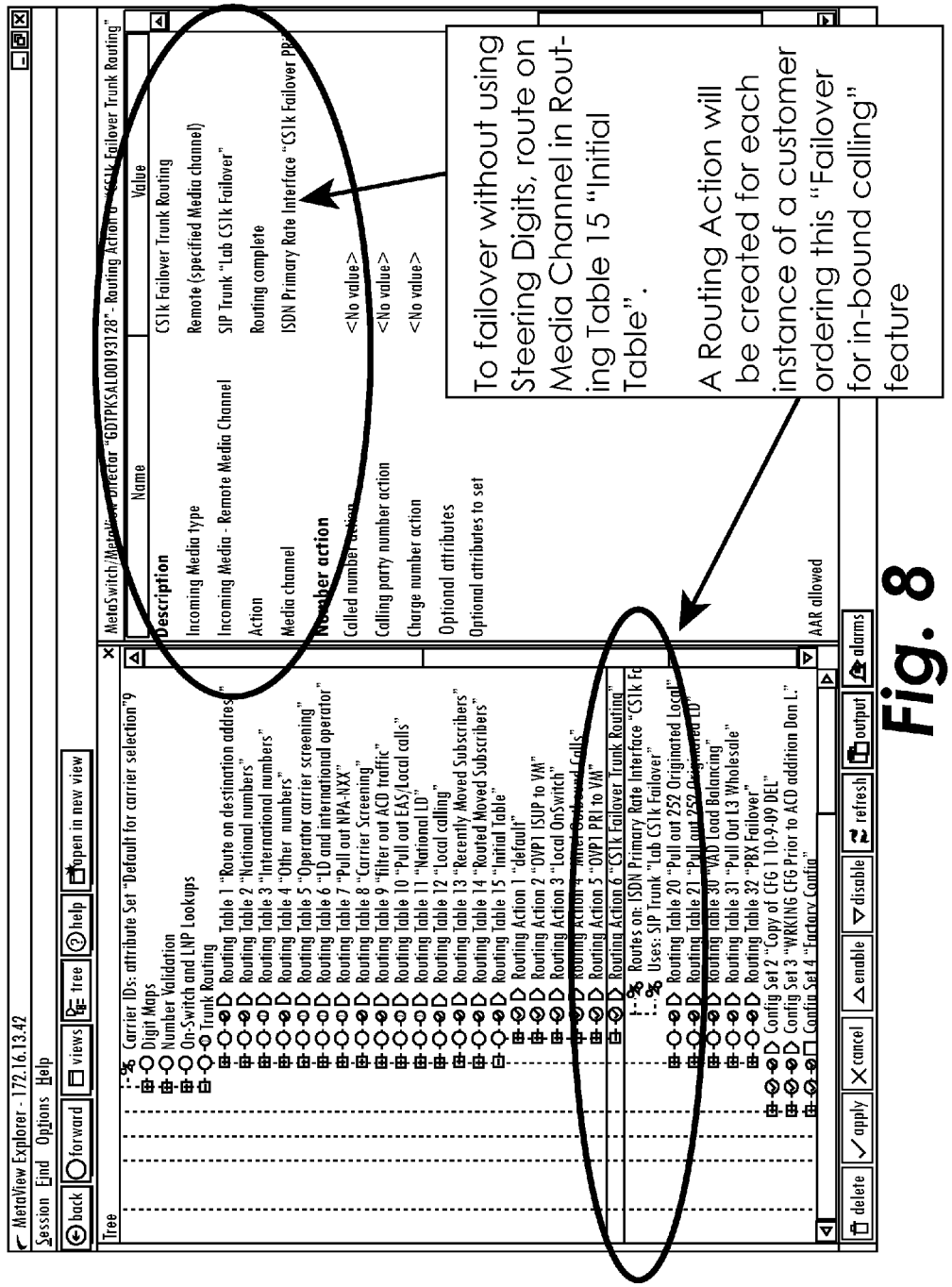
FIGS. 8 and 9 illustrate a Trunk Routing Data fill according to one embodiment of the present disclosure.
Figure 9:
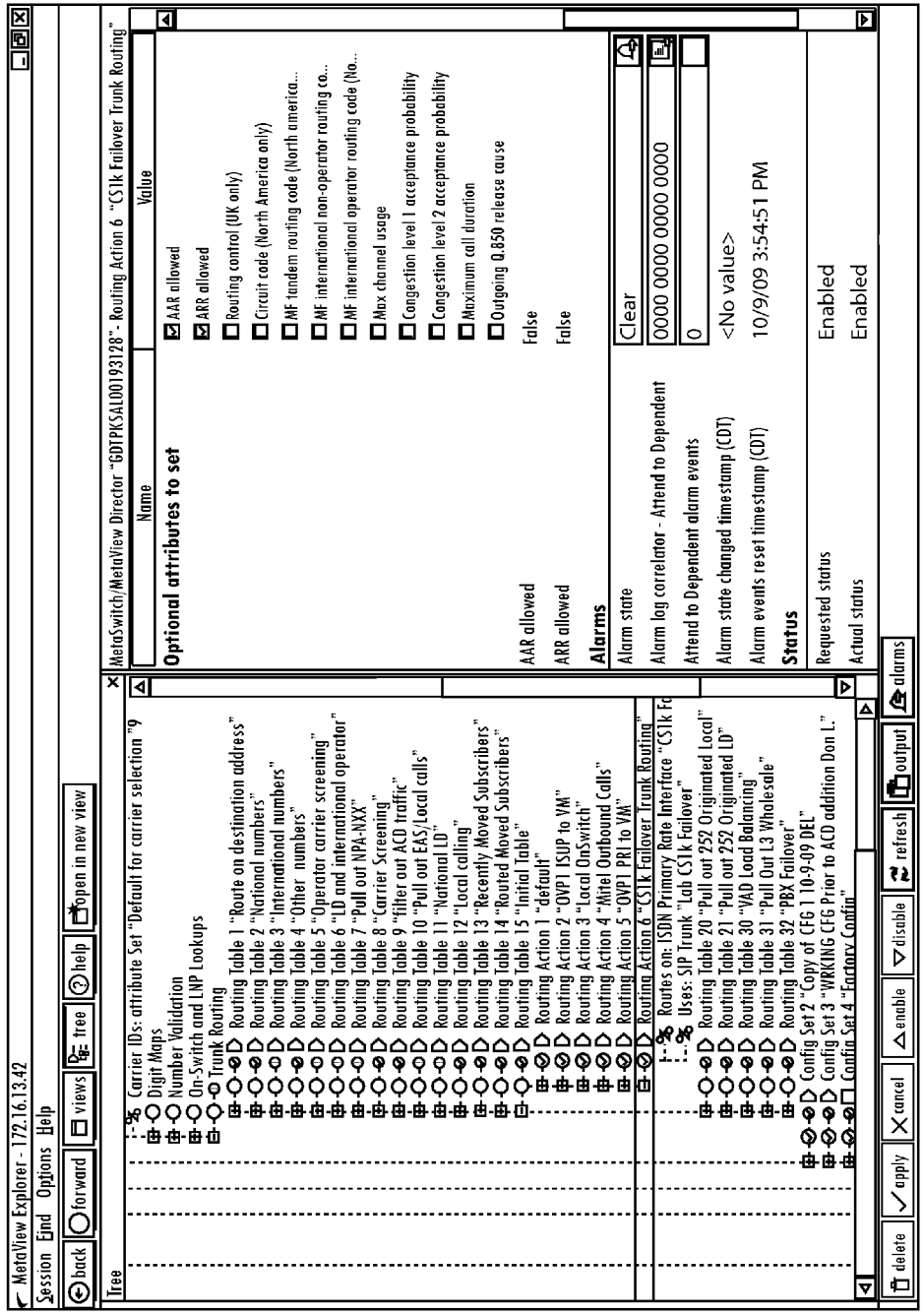

FIGS. 8 and 9 illustrate a Trunk Routing Data fill using MetaView Explorer.

Figure 10:
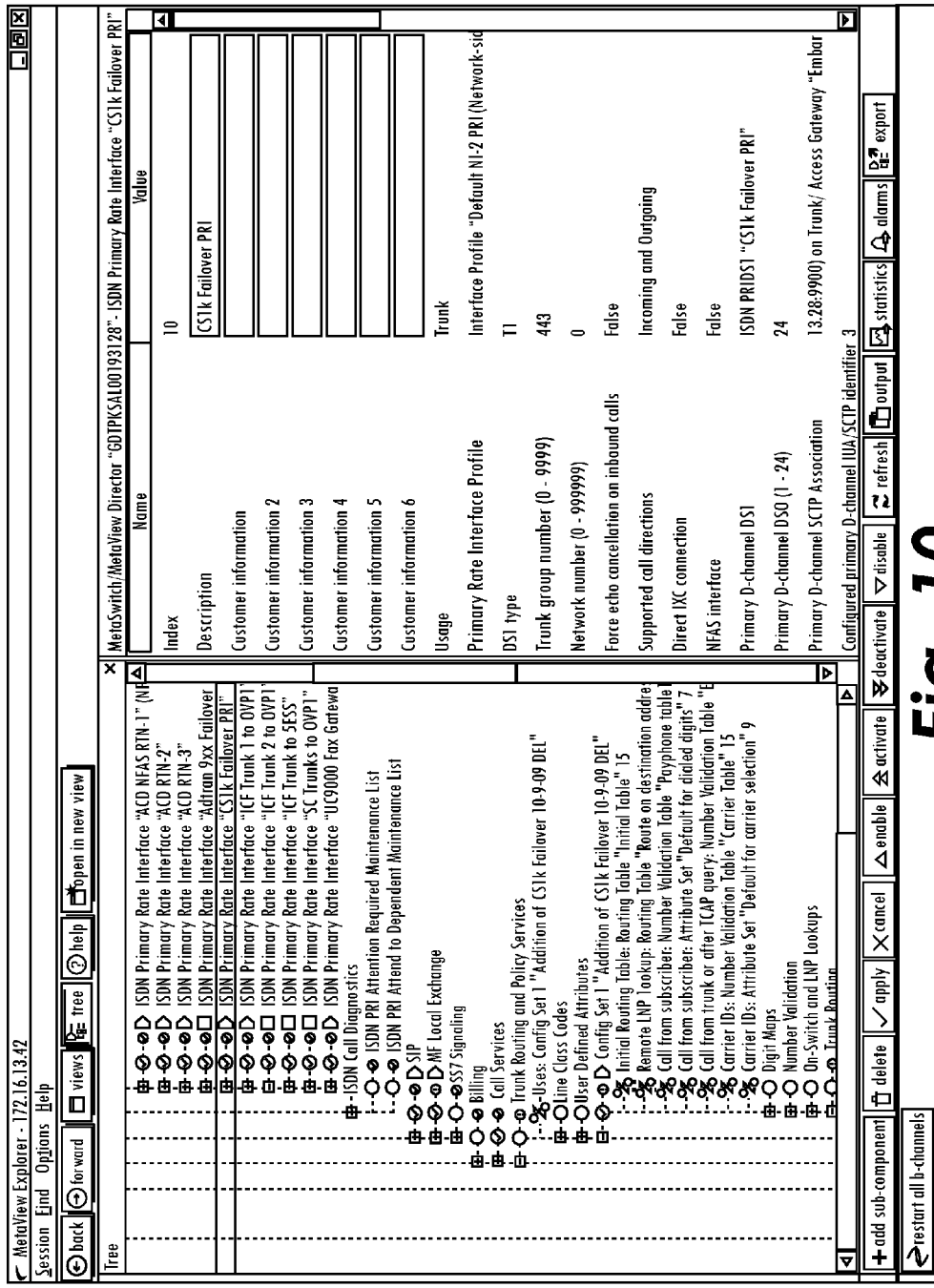
FIGS. 10 and 11 illustrate a PRI data fill according to one embodiment of the present disclosure.
Figure 11:
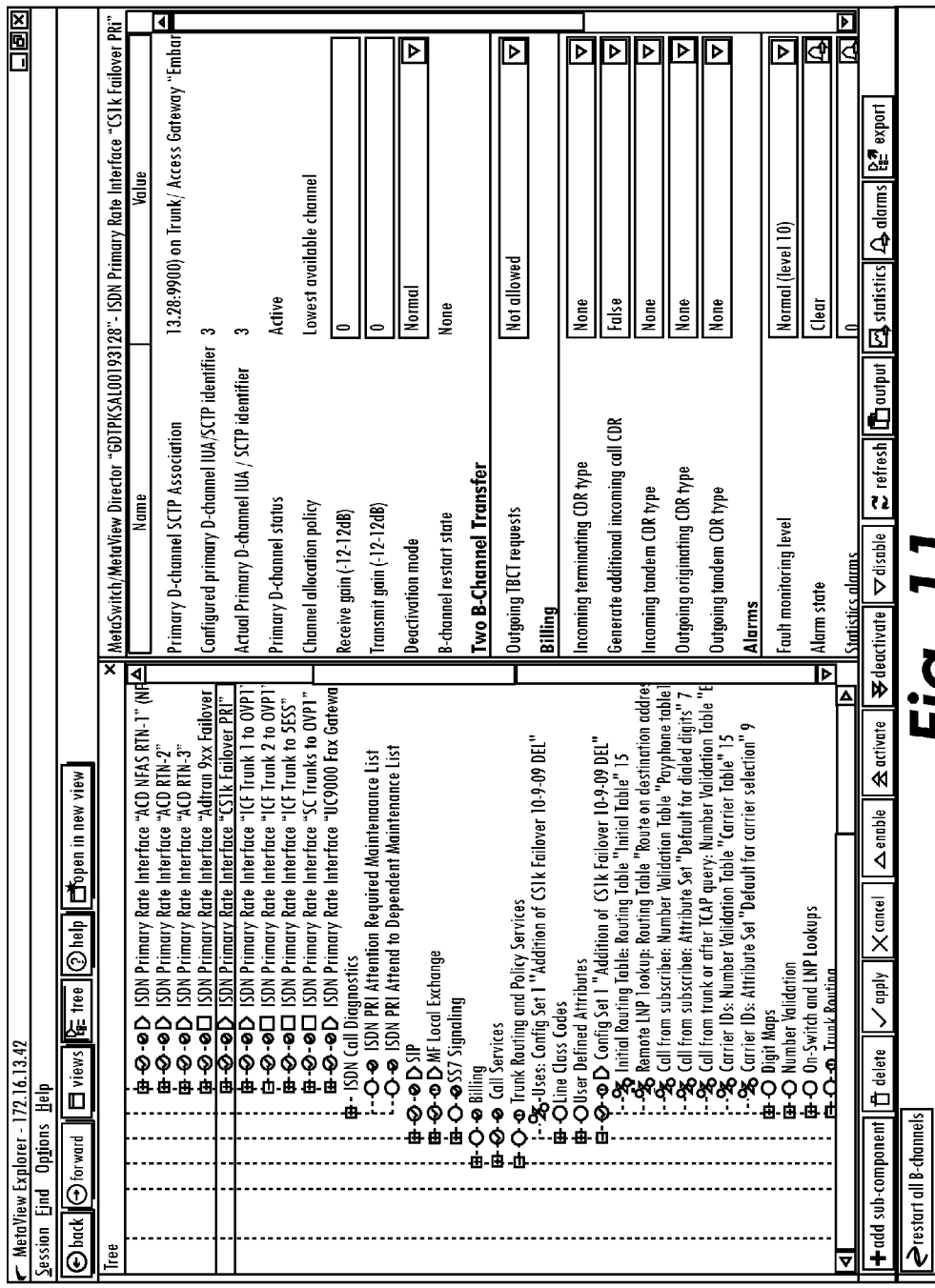

FIGS. 10 and 11 illustrate a PRI data fill using MetaView Explorer.

Figure 12:
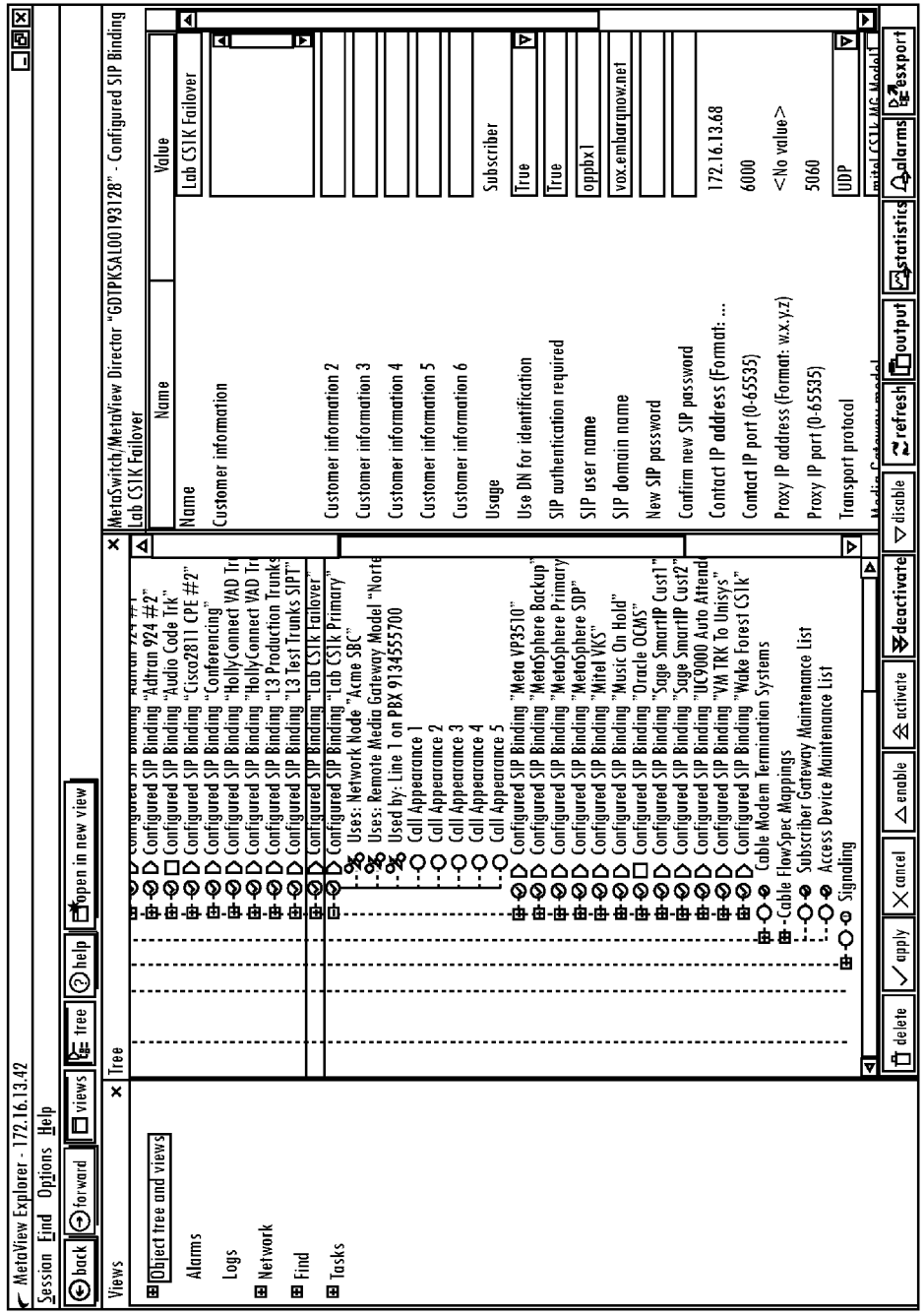
FIG. 12 illustrates a Primary SIP Trunk to Session Border Controller for an Internet Protocol Private Branch Exchange data fill according to one embodiment of the present disclosure.

FIG. 12 illustrates a data fill for the Primary SIP Trunk to SBC 126 for a Nortel CS1000 IP-PBX 10 using MetaView Explorer.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed:

1. A method for communication failover, the method comprising the steps of:
    (a) attempting to establish a first telecommunication link over a data network for outbound communication or inbound communication;
    (b) failing to establish said first telecommunication link over the data network by failing to connect to a session border controller; and (c) upon said failing to establish said first telecommunication link over the data network, automatically establishing a second telecommunication link over a first time division multiplexing (TDM) voice line communicatively coupled to a Class 5 switch for outbound communications, or automatically establishing the second telecommunication link over a second TDM voice line coupled to a media gateway communicatively coupled to the data network for inbound communications;

wherein attempting to establish the first telecommunication link over the data network includes attempting to establish the first telecommunication link without connecting via the Class 5 switch to provide a Voice over Internet Protocol (VoIP) connection between a subscriber premise and a VoIP interexchange carrier (IXC) without having to use a public switched telephone network (PSTN), and wherein the second telecommunication link provides a redundant path using the PSTN.

2. The method of claim 1, wherein said first telecommunication link is to a the VoIP IXC.

3. The method of claim 1, wherein said second telecommunication link is to a time-division multiplexing interexchange carrier.

4. The method of claim 1, wherein said second telecommunication link comprises a time-division multiplexing primary rate interface.

5. The method of claim 1, wherein step (a) comprises attempting to establish said first communication link out of an enterprise and step (c) is performed by a device located within said enterprise.

6. The method of claim 5, wherein step (a) further comprises attempting to establish said first communication link to an Ethernet access switch over a Session Initiation Protocol trunk.

7. The method of claim 1, wherein said first telecommunication link is from the VoIP IXC.

8. The method of claim 1, wherein said first telecommunication link is from a time-division multiplexing interexchange carrier.

9. The method of claim 1, wherein step (a) comprises attempting to establish said first communication link into an enterprise and step (c) is performed by a device located outside said enterprise.

10. The method of claim 1, wherein said data network comprises the internet.

11. A system for communication failover, comprising:
a private branch exchange;
a first time division multiplexing (TDM) communication line operatively coupled to said private branch exchange;
a Class 5 switch operatively coupled to said first TDM communication line; and
a second TDM communication line operatively coupled to said private branch exchange, said second TDM communication line not coupled to said Class 5 switch, wherein the private branch exchange is configured to attempt to establish a first communication link over a data network, and upon failing to establish the first communication link by
failing to connect to a session border controller, to automatically establish a second communication link over the first TDM communication line for outgoing communications, and to automatically establish the second communication link over the second TDM communication line for inbound communications, wherein the first communication link provides a Voice over Internet Protocol (VoIP) connection between a subscriber premise and a VoIP interexchange carrier (IXC) without having to use a public switched telephone network (PSTN), and wherein the second telecommunication link provides a redundant path using the PSTN.

12. The system of claim 11, wherein said private branch exchange comprises an internet protocol private branch exchange.

13. The system of claim 11, wherein said first TDM communication line comprises a time-division multiplexing primary rate interface.

14. The system of claim 11, wherein said second TDM communication line comprises a time-division multiplexing primary rate interface.

15. The system of claim 11, further comprising:
a data network operatively coupled to said private branch exchange;
a trunk line operatively coupled to said Class 5 switch; and
a media gateway operatively coupled to said second TDM communication line and to said trunk line.

16. The system of claim 15, wherein said data network comprises the internet.

17. The system of claim 15, wherein said trunk line comprises an ISUP trunk.

18. The system of claim 15, wherein said private branch exchange is operative to establish communication for outbound calls on said first TDM communication line when communication cannot be established on said data network.

19. The system of claim 15, further comprising:
a media gateway controller operatively coupled to said media gateway; and
a session border controller operatively coupled to said media gateway controller and to said data network.

20. The system of claim 19, wherein said session border controller is operative to establish communication for inbound calls to the private branch exchange on said second TDM communication line when communication cannot be established on said data network.

21. The system of claim 19, further comprising:
an Ethernet access switch operatively coupled between said session border controller and said data network.

22. The system of claim 11, further comprising:
a time-division multiplexing interexchange carrier operatively coupled to the Class 5 switch.

23. The system of claim 19, further comprising:
the VoIP IXC operatively coupled to the session border controller.

* * * * *